United States Patent Office 3,549,516
Patented Dec. 22, 1970

3,549,516
PROCESS FOR PRODUCING POLYHEXAMETHYL-
ENE SUBERAMIDE
David Kirkaldy, Raglan, England, assignor to Imperial
Chemical Industries Limited, London, England, a corporation of Great Britain
No Drawing. Continuation of application Ser. No.
560,783, June 27, 1966. This application Aug. 15,
1969, Ser. No. 850,677
Claims priority, application Great Britain, June 28, 1965,
27,279/65
Int. Cl. C08g 20/20
U.S. Cl. 260—78
2 Claims

ABSTRACT OF THE DISCLOSURE

A process for producing a high softening point polyhexamethylene suberamide (nylon 6.8) and the composition produced which has a Vicat softening point of at least 234 degrees centigrade. The composition is produced utilizing a novel source of very pure suberic acid. The nylon 6.8 produced is particularly suitable for textile and tire cord usage because of greatly improved properties, particularly the ease of obtaining high relative viscosities and the resulting high tenacity compared to previously known nylon 6.8 materials.

---

This application is a continuation of Ser. No. 560,783, filed June 27, 1966, now abandoned.

The present invention is concerned with improvements relating to polyamides and has exclusive reference to polyhexamethylene suberamide and to the process for its manufacture and to filaments and fibres obtained therefrom.

Polyhexamethylene suberamide, hereinafter referred to as 6.8 nylon, is known from the literature from which it is clear that it can be melt spun into filaments. However there is little published information relating to the properties of the polymer or the filaments obtained therefrom by melt spinning. Such published information as there is suggests, at least by implication, that the properties are inferior to those of polyhexamethylene adipamide (66 nylon) polymer or filaments (see, for example, Journal of Polymer Science, 1947, vol. 2, No. 3, page 306).

In the past experimental amounts of nylon 6.8 have been prepared by the condensation of hexamethylene diamine with suberic acid using conventional polymerisation techniques, the suberic acid used in such preparations having been obtained via the oxidation of castor oil. The optical melting point for polyhexamethylene suberamide so obtained being quoted in the literature as 215° C. to 220° C. We have now made the unexpected discovery that if nylon 6.8 is prepared from hexamethylene adipamide and suberic acid which has been obtained synthetically, e.g. via the dimersation of butadiene to cyclooctadiene then by oxidation into suberic acid, the resultant polymer has a Vicat softening point of at least 234° C. that is 14° C. to 19° C. higher than the previously quoted optical melting point for this polymer, the Vicat softening point being normally 5° C.–10° C. lower than the optical melting point for a given polymer. Furthermore filaments spun from this polymer exhibit improved properties compared with those obtainable from the polymer during the lower softening point, and which are, in some respects at least, better than these of 66 nylon obtained under comparable conditions of spinning and drawing. Thus filaments of 6.8 nylon having tenacities of 10–12 gms./denier and initial moduli in excess of 40 are readily obtained by drawing the filaments in a heated condition. The present 6.8 nylon polymer has other advantages compared with 66 nylon, thus higher relative viscosities (R.V.) (desirable for obtaining high tenacity yarns) can easily be obtained, the equilibrium R.V. for 6.8 nylon under steam at atmospheric pressure and a temperature of 280° C. being 75, compared with 50 for 66 nylon, and the filaments obtained therefrom have better thermal stability—comparable with those of polyepsilon caprolactam (6 nylon).

Accordingly therefore the present invention provides a polyamide namely polyhexamethylene suberamide having a Vicat softening point of at least 234° C. formed by polycondensation of hexamethylene diamine with suberic acid. Preferably the suberic acid is obtained synthetically by the dimerisation of butadiene into cyclooctadiene and oxidation to the acid, and the polymer should normally have a relative viscosity of not less than 30 in order to be fibre-forming.

The invention also includes a process for the manufacture of polyhexamethylene suberamide having a Vicat softening point of at least 234° C. wherein hexamethylene diamine and suberic acid, obtained by the dimerisation of butadiene into cyclooctadiene and oxidation to the acid, are condensed together in the presence of an acid or base stabiliser under known polyamide forming condtions such as are described hereinafter.

The invention further includes textile filaments spun from the above-mentioned polymer which filaments preferably should have a modulus measured at 5% extension of at least 30 more preferably at least 40, a tenacity of at least 7 g./denier and an extension to break of less than 30%.

The invention still further includes a process for the manufacture of textile filaments from the aforementioned polyhexamethylene suberamide by melt spinning.

The invention still further includes tyre cord yarns formed from the aforementioned textile filaments, which cords preferably have an $E_{10}$ value not greater than 6.0 after processing.

The various parameters employed in defining the products of the present invention are determined by the methods described below.

TENACITY

This is determined as for nylon 6.6 yarns on an Instron tensile testing machine and it represents the breaking load in gms./initial denier of the yarn under standard conditions of temperatures and humidity (65% R.H. and 68° F.) and at a rate of extension of 100% per minute. The main result on 5 samples of 50 cms. length is taken.

INITIAL MODULUS

This is a measure of the force required to effect a small extension of a yarn of unit denier. The values quoted are of the slope, at 1% extension, of the curve obtained when the load in gms./denier is plotted against the percentage extension under the above-mentioned standard conditions of temperature and humidity, but continuously on an Instron tensile testing machine at 10% extension per minute. The main result of 5 samples of 10 cms. length is taken.

MODULUS AT 5% EXTENSION

This is used as an alternative to initial modulus where the initial modulus cannot conveniently be determined and is the average value of the slope of the above-mentioned curve between 0 and 5% extension. The initial modulus and modulus at 5% extension differ very little in magnitude one from another.

EXTENSION TO BREAK

This is quoted as a percentage and is measured on an Instron tensile testing machine under the same conditions as for the tenacity.

RELATIVE VISCOSITY

This is the ratio of the viscosity of an 8.4% by weight solution of the polymer in 90% aqueous formic acid at 25° C. to the viscosity of a 90% by weight aqueous solution of formic acid at 25° C.

INHERENT VISCOSITY

This is defined as twice the natural logarithm of the ratio of the viscosity of a ½% (weight of polyamide in gms. by volume of solution in cc.) solution of the polyamide in a 90% by weight aqueous solution of phenol under the above-mentioned standard conditions of temperature and humidity to the viscosity of a 90% by weight aqueous solution of phenol under those standard conditions of temperature and humidity.

VICAT SOFTENING TEMPERATURE

This is determined by a penetrometer essentially the same as the apparatus described by Edgar and Ellery at page 2638 of the Journal of Chemical Society, 1952. The vertical displacement with temperature of a weighted rod resting on a block of the polymer is recorded. The temperature at which movement of the rod begins is in the beginning of the softening range and the temperature at the steepest part of the curve (generally asymotic to the temperature axis) is taken as the Vicat softening point. A weighted rod of 3/16-inch diameter and total weight 300 gms. is used. The temperature is increased at a rate of 10° C. per minute.

The suberic acid manufactured by the dimerisation of butadiene into cyclooctadiene and oxidation to the acid and used in the experiments detailed herein had a parity of not less than 99.5%, recrystallisation from water improved the purity to not less than 99.9%.

Nylon 6.8 polymer was prepared by first forming hexamethylene diammonium suberate salt by the addition of equimolar proportions of suberic acid and hexamethylene diamine to a suitable solvent, such a methanol or more preferably 3:1 isopropanol/water, and crystalling from the solvent. The salt, containing a slight excess of diamine, was then polymerised in an autoclave under standard conditions for the preparation of 6.6 nylon polymer. A typical autoclave procedure for the polymerisation of nylon 6.8 salt is as follows:

Cycle 1.—Preheat the aqueous salt solution containing, say, 60% by weight of salt to 210° C. and a pressure in the autoclave above the solution of 250 p.s.i.

Cycle 2.—Heat for one hour at an internal pressure of 250 p.s.i. during which time steam is bled off and the temperature rises from 210° C. to about 217° C.

Cycle 3.—Heat for a further period of one hour with gradual reduction of pressure to atmospheric pressure, with further bleed off of steam the temperature increasing to 265° C.

Cycle 4.—Heat for a final period of from 30 minutes to 1½ hours at atmospheric pressure, the temperature increasing to 280° C. Desirably, the solution in the autoclave is stirred continuously during polymerisation using, for example, a helical stirrer.

The temperature of the condensation reaction may be within the range of about 210 to 300° C. The atmosphere above the polymer may be steam, when the polymer can attain equilibrium, or it may be flushed continuously with nitrogen to enable high R.V. polymers to be obtained.

The molten polymer that results can be extruded from the autoclave even when it has a relative viscosity as high as 75–110.

As an alternative to autoclave methods of preparation, nylon 6.8 salts may be polymerised in solution by a continuous polymerisation method involving passing the salt solution through a heated narrow tube or coil as described in British Pat. Specification No. 924,630. The aqueous salt solution used for polymerisation may suitably contain 35% by weight of salt and 0.9% by weight of excess hexamethylene diamine and the temperature of polymerisation may be 290° C.

Molecular weight stabilisation can be achieved by the same agents as are used for nylon 6.6 polymer, acetic acid at a concentration of up to 1.0 mole percent being preferred. It has been found that the equilibrium value for the relative viscosity of nylon 6.8 polymer is considerably higher at a given mole percent content of stabiliser than it is for nylon 6.6 polymer. High relative viscosity nylon 66 polymers are obtainable only by special techniques such as solid phase polymerisation of autoclave-prepared polymer, where equilibrium is displaced towards further polymerisation. That very high relative viscosity nylon 6.8 polymers would be easily preparable by autoclave methods was itself unexpected, but the fact that they could be extruded from the autoclave, for example, under nitrogen pressure, for ribbon formation and subsequent breaking up into chips was very surprising in view of the difficulty with which nylon 6.6 polymers of relatively high viscosity can be extruded from an autoclave.

In general the nylon 6.8 polymer of this invention can be melt spun and drawn into textile filaments under similar conditions to those used in the preparation of 66 nylon filaments. The properties of 6.8 nylon yarn are much the same as those of 66 nylon yarn with the important exception that under given conditions nylon 6.8 exhibits a higher tenacity and modulus. Thus a nylon 6.8 yarn having a given amine end group content (A.E.G.) has essentially the same dyeing characteristics towards acid dyestuffs as a 66 nylon yarn of the same A.E.G. The boiling water shrinkage of nylon 6.8 yarns is generally within the range from 7–11%, i.e. similar to 6.6 nylon.

Nylon 6.8 yarns can also be hot drawn, e.g. by being passed over a hot plate at 120–180° C. which is positioned between the draw rolls and the snubbing pin of a conventional drawing apparatus, to yield high tenacity low extensibility yarns for tyre cords and similar applications.

The following examples illustrate but do not limit the invention. In these examples the suberic acid was, unless otherwise stated, manufactured by the dimerisation of butadiene into cyclooctadiene and subsequently oxidised to the acid.

EXAMPLE 1

Nylon 6.8 salt was prepared as follows.

Hexamethylene diamine (154.6 lbs. of a 60% by weight aqueous solution), isopropanol (205 lbs.), and deionised water (88 lbs.) were charged into a suitable vessel and recrystallised suberic acid (139.2 lbs.) was added slowly with continuous stirring. Air was excluded from the vessel interior by a continuous flow of nitrogen gas. The internal temperature rose during acid addition to 45° C. approximately, and after all the acid had been added the temperature was raised to 75° C., at which temperature the acid had fully dissolved, and the solution had a volume of 56 imperial gallons. By very small additions of acid or amine at 70–75° C. a condition was obtained when a sample of the solution, diluted with 3 times its weight of deionised water, gave a pH reading with a glass electrode pH meter of 7.2–7.5.

Hyflo Supercel (3 lbs.) (a registered trademark associated with a brand of diatomaceous earth) was then added to the solution, the temperature of the solution was raised to 80° C. and maintained at the temperature for a period of 20–30 minutes and thereafter the solution was filtered using a steam-heated pressure filter dressed with washed twill and printers cloth bags. 80 lbs. of a 1:3 w./w. mixture of water and isopropanol was used to wash both the reaction vessel interior and the filter. Nyon 6.8 salt could be crystallised from the solution, with incorporated washings, at 55–60° C.

Clean isopropanol (192 lbs.) was added to the filtered solution and the temperature of the solution was raised to boiling. The solution which was then clear and bright was cooled slowly under nitrogen to a temperature of 15–20° C., at which temperature crystallisation of nylon 6,8 salt was complete. Crystallisation of salt began at 70–75° C.

The crystallised nylon 6.8 salt was left in contact with its supernatant liquor for 2 hours before filtering off in a nitrogen atmosphere using a nutsche dressed with calico bags. The filtered salt was washed with isopropanol (3×80 lbs.) and dried during the course of 24–28 hours at 70–75° C.

The yield of salt was 82.6% and the analyses of three separately prepared batches of salt are set out below.

|  | Batch 1 | Batch 2 | Batch |
|---|---|---|---|
| Total Bases (calc. to N.W. 116) | 39.9 | 39.8 | 39.9 |
| Total Acids (M.W. 174) | 60.1 | 59.9 | 60.15 |
| Equivalent Ratio (Base:Acid) | 1.000:1.004 | 1.000:1.003 | 1.000:1.0045 |
| pH of 10% aqueous solution | 7.4 | 7.4 | 7.4 |
| Isopropanol content, percent | None | None | None |
| Moisture content, percent | 0.08 | 0.1 | 0.16 |
| Phosphorus (P) (p.p.m.); Iron (Fe) (p.p.m.) | 2 (All less than 5) | 2 | 1 |

The salt was polymerised using an autoclave and a charge of a 60% by weight solution of the salt in water. The procedure followed was the four-cycle procedure described in detail hereinbefore and the autoclave charge was stirred continuously throughout polymerisation using a helical stirrer. In the final stage of the four-cycle process the polymer was heated for 1 hour under steam at atmospheric pressure. As polymer antioxidant, 40 p.p.m. of copper as copper acetate and 1,000 p.p.m. of iodine as hexamethylene diammonium iodide were incorporated in the charge to the autoclave (the parts being by weight and based on the polymer) and molecular weight stabilisation was achieved using 0.25 mole percent based on the salt of acetic acid.

The finished polymer was extruded from the autoclave in the form of a ribbon, cooled and cut into chips. The polymer chip had a Vicat softening point of 234° C. and a relative viscosity of 51.2.

The polymer as prepared above was melt spun through a 34-hole spinneret of a screw extruder at a spun-yarn wind-up speed of 669 ft./minute to give a spun denier of 1140. The melt in the screw extruder was maintained at a temperature of about 290° C. The yarn was cooled below the spinneret by blowing air onto the extruded filaments and the yarn was then passed through a steam conditioner. A spinning finish was applied to the yarn to give an oil on yarn content of 0.4% by weight. The yarn had a relative viscosity of 57.4.

The as-spun yarn was hot-drawn by means including a 4-6-inch length heater plate maintained at 180° C. immediately after spinning at a draw ratio of 5.9 and a wind-up speed of 750 ft./minute to give yarn with the following properties:

Tenacity—12.1 g./d.,
Extension to break—18%, and
Modulus at 5% extension—40 g./d./100% extension

EXAMPLES 2–7

A number of batches of nylon 6.8 polymer were made according to the following procedure.

Crude suberic acid of greater than 99.5% purity was first slurried with acetone to remove much of its colouring matter and then dissolved in demineralised water (25 kg. of crude acid/140 litres of water). The acid solution was heated under reflux for a period of ½ hour in the presence of a quantity of carbon and Hiflo Supercel (a registered trademark associated with a brand of diatomaceous earth). The salt solution was filtered and cooled to 20° C. to effect crystallisation of the suberic acid. The crystallised acid was separated from the mother liquor by filtration and was dried at 50° C. for 48 hours to constant weight in an air oven. The solid acid was white, had a melting point of 141–142.5° C., and a solution of the acid in 10% sodium hydroxide was almost colourless. The yield of acid was 94%.

Hexamethylene diamine (re-distilled) was dissolved in pure methanol to form a solution containing about 4 kg. of diamine per 75 litres of methanol. Suberic acid was added in such quantity that the diamine was present in 4 mole percent excess and the mixture was heated under reflux with stirring until all the acid had dissolved. The solution was cooled to below 25° C. with continuous stirring to effect precipitation of the nylon 6.8 salt, the salt was filtered off, washed with cold methanol and dried at 60° C. under a pressure of 100 mm. Hg.

The yield of salt was 52% based on the weight of suberic acid used and on analysis the salt was found to contain an amine end group content (A.E.G.) of $6915/10^6$ gms. and a carboxyl end group (C.E.G.) of $6913/10^6$ gms. (Theory demands 6897 end groups (A.E.G. or C.E.G.) per $10^6$ gms.)

For the purpose of molecular weight stabilisation about 0.25 mole percent of acetic acid stabiliser was incorporated with the salt and the polymerisation was carried out in all cases under closely similar conditions of temperature, pressure and duration of reaction, and the pattern of reaction was very similar to that described under Example 1.

The polymer obtained were rod-spun at a temperature of 270–285° C. using rod spinning equipment and at a wind-up speed of 400 ft./minute.

The spun yarns were drawn at a delivery speed of 50 ft./minute both over a cold surface plate at room temperature and over a 4-6-inch length heater plate maintained at 180° C. The boiling-water shrinkage of the yarns was also investigated.

The results obtained are set out in Tables 1 and 2.

These results demonstrate that nylon 6.8 polymers can be made that are capable of yielding yarns of outstanding potential for use in many of the present day outlets for textile fibres.

TABLE 1.—SALT, POLYMER AND SPUN YARN PROPERTIES OF NYLON 6.8

|  | Yield of salt, percent | Salt analysis | | Polymer analysis | | | Vicat softening point, ° C. | Spinning temp. in ° C. | No. of filaments | Wind-up speed, ft./min. | Analysis of yarn | | |
|---|---|---|---|---|---|---|---|---|---|---|---|---|---|
|  |  | A.E.G. | C.E.G. | I.V. | A.E.G. | C.E.G. |  |  |  |  | I.V. | A.E.G. | C.E.G. |
| Example: |  |  |  |  |  |  |  |  |  |  |  |  |  |
| 2 | 67 | 6,865 | 6,947 | 0.819 | 33 | 91 | 235 | 270 | 5 | 400 | 0.906 | 30.4 | 78 |
| 3 | 70 | 6,914 | 6,894 | 0.914 | 38.5 | 72 | 236 | 270 | 5 | 400 | 0.892 | 34.4 | 69 |
| 4 | 77.5 | 6,919 | 6,874 | 0.88 | 40.6 | 80 | 235 | 270 | 5 | 400 | 0.866 | 33.3 | 80 |
| 5 | 66 | 6,914 | 6,874 | 0.911 | 42.8 | 77 | 235 | 270 | 5 | 400 | 0.942 | 35.4 | 73 |
| 6 | 68 | 6,913 | 6,845 | 0.916 | 40.9 | 60 | 235 | 270 | 5 | 400 | 0.915 | 35.9 | 68 |
| 7 | 46.6 | 6,878 | 6,929 | 0.88 | 43 | 64 | 234 | 278 | 5 | 400 | 0.89 | 30.4 | 76 |

TABLE 2.—DRAWING CONDITIONS AND DRAWN YARN PROPERTIES OF NYLON 6.8

| | | | Properties of yarn | | | | Properties of yarn after boiling | | | |
|---|---|---|---|---|---|---|---|---|---|---|
| | Draw ratio | Hot plate temp. in ° C. | Denier | Tenacity, g./d. | Extension, Percent | I.M. at 1% ext. g./d./100% ext. | Boiling water shrinkage, percent | Denier | Tenacity, g./d. | Extension, percent | I.M. at 1% ext. g./d./100% ext. |
|---|---|---|---|---|---|---|---|---|---|---|---|
| Example: | | | | | | | | | | | |
| 2 | 5.0 | Room temp | 24.9 | 7.54 | 24.4 | 38.5 | 11.95 | 26.1 | 6.85 | 37.0 | 29.6 |
| 3 | 5.0 | ____do____ | 24.0 | 7.92 | 24.3 | 40.1 | 11.6 | 28.5 | 6.20 | 37.3 | 25.8 |
|   | 6.0 | 180 | 19.8 | 11.15 | 14.0 | 53.2 | 9.83 | 25.8 | 8.51 | 23.5 | 32.5 |
| 4 | 5.0 | Room temp | 25.1 | 7.65 | 23.7 | 39.5 | 11.5 | 31.9 | 5.90 | 35.3 | 26.7 |
|   | 6.0 | 180 | 20.0 | 11.6 | 15.7 | 52.0 | 9.3 | 26.0 | 8.89 | 24.4 | 32.4 |
| 5 | 4.75 | Room temp | 26.6 | 6.68 | 23.1 | 37.0 | 11.5 | 32.8 | 5.53 | 37.7 | 25.6 |
|   | 6.0 | 180 | 20.4 | 11.4 | 14.4 | 54.4 | 9.53 | 26.8 | 9.07 | 23.4 | 35.0 |
| 6 | 4.75 | Room temp | 25.3 | 6.79 | 26.1 | 38.6 | 11.4 | 27.6 | 4.95 | 33.6 | 19.9 |
|   | 5.75 | 180 | 21.0 | 10.5 | 14.8 | 52.95 | 9.33 | 23.9 | 9.0 | 23.9 | 35.3 |
| 7 | 5.0 | Room temp | 20.0 | 6.89 | 23.1 | 26.4 | | | | | |
|   | 5.25 | 180 | 19.875 | 7.12 | 18.75 | 29.5 | | | | | |
|   | 5.75 | 180 | 16.75 | 9.4 | 15.54 | 38.0 | | | | | |
|   | 6.0 | 180 | 16.5 | 10.25 | 15.15 | 37.8 | | | | | |

EXAMPLE 8

Nylon 6.8 salt prepared as described in Examples 2–7, was polymerised in a continuous polymerisation unit as described in British Pat. Specification No. 924,630 which was capable of a throughput of polymer of 2 lb./hour. The polymerisation reaction was carried out at a temperature of 300° C. and polymer was formed at a rate of 1.35 lb./hour. The nylon 6.8 salt was fed to the polymerisation unit as an aqueous solution containing 40% by weight of salt, 8.4 g. H.M.D./kg. of salt solution and 0.56 g./kg. glacial acetic acid. The polymer obtained had the following properties:

Amine end group content (A.E.G.)—49.1 per $10^6$ gms.
Carboxyl end group content (C.E.G.)—74 per $10^6$ gms.
Relative viscosity—42.9.
Vicat softening point—235° C.

The molten polymer was fed directly to the melt pool of a spinning machine and spun under normal conditions at 956 f.p.m. as a 330 denier 10 filament yarn. The yarn was draw over at hot plate at 200° C. at a draw ratio of 5.8 and a drawing speed of 650 f.p.m. The drawn yarn had a tenacity of 10.2 g./d., an extension to break of 9.9% and modulus of 38 g./d./100% extension measured at 5% extension.

The results obtained show that high tenacity and high initial modulus yarns can be obtained from polymer prepared in a continuous polymerisation unit of the kind described in the aforementioned British patent specification.

EXAMPLE 9

For the purpose of comparison only a sample of suberic acid obtained by the oxidation of castor oil was purified by conversion into the ethyl ester which was fractionally distilled, (the material boiling at 138° C. to 141° C. at 0.7 mm. Hg pressure being collected), and then hydrolysed back to the free acid. 6.8 nylon salt was prepared and polymerised by the process described with reference to Examples 2–7. The resultant polymer had Vicat softening point of 228° C. and an inherent viscosity of 0.79 and was rod spun to yield a 30 denier 10 filament (30/10) drawn yarn. Conditions of spinning and drawing and yarn properties are given in Table 3.

TABLE 3.—SPINNING AND DRAWING CONDITIONS AND YARN PROPERTIES OF NYLON 6.8 OBTAINED USING SUBERIC ACID MANUFACTURED BY THE OXIDATION OF CASTOR OIL

| Spinning and drawing conditions | | | | | Yarn properties | | |
|---|---|---|---|---|---|---|---|
| Spinning speed, ft./min. | Spinning temp., ° C. | Draw ratio, max. | Drawing speed, ft./min. | Drawing temp., ° C. | Tenacity, g./d. | Ext. at break, percent | I.M. g./d./ 100 ext. at 1% ext. |
| 400 | 265 | 5.0 | 50 | 160 | 6.8 | 24 | 35 |

These results indicate that polymer prepared using suberic acid obtained via the oxidation of castor oil, even after an uneconomically attractive purification process, yields a polymer of lower melting point and a yarn of inferior properties compared with those obtained starting from suberic acid obtained by the synthetic route referred to herein.

EXAMPLE 10

Nylon 6.8 polymer prepared by the process described in Example 1 containing 0.3% $Ti_1O_2$ and having a Vicat softening point of 234° C. and an R.V. in the range 35–40 was spun and drawn into a 30/10 yarn using a standard gravity melter for spinning. The spinning and drawing conditions and drawn yarn properties are given in Table 4.

TABLE 4.—SPINNING AND DRAWING CONDITIONS AND YARN PROPERTIES OF 30/10 6.8 NYLON YARN CONTAINING 0.3% $Ti_1O_2$

| Spinning and drawing conditions | | | | | Yarn properties | | |
|---|---|---|---|---|---|---|---|
| Spinning speed, ft./min. | Temp., ° C. | Spun denier | Draw ratio | Temp., ° C. | Drawing Speed, ft./min. | Tenacity, g./d. | Extension at break, percent | Modulus g./d./100% extension at 5% extension |
| 3,930 | 285 | 80 | 2.62 | Room | 1,520 | 6.0 | 26.9 | 30.8 |

The above yarn was warp-knitted into a shirting fabric which was heat set at 190° C. for 27 seconds without discolouration (in contrast to 66 nylon which has to be set at about 220° C. for 28 seconds and discolours). The fabric had $b$ chromaticity value of 0.333 before bleaching that is the same as for 6 nylon, the 66 nylon giving a value of about 0.320; $b$ chromaticity is a measure of the yellowness of a fabric and is defined as:

$$b \text{ chromaticity} = \Sigma \frac{b \text{ reflectance}}{r + g + b \text{ reflectances}}$$

where $r$, $g$, and $b$ are the red, green, and blue reflectances as measured using a trichromatic colourimeter.

EXAMPLE 11

The polymer of Example 10 was spun and drawn into 70/20 and 70/34 in the manner described in that example. Spinning and drawing conditions and drawn yarn properties are given in Table 5.

TABLE 5

| | Spinning and drawing conditions | | | | | Yarn properties | |
|---|---|---|---|---|---|---|---|
| | Spinning speed, ft./min. | Temp., °C. | Spun denier | Draw ratio | Temp., °C. | Drawing speed, ft./min. | Tenacity, g./d. | Ect. at break, percent |
| Yarn type: | | | | | | | | |
| 70/20 | 2,965 | 285 | 240 | 3.3 | Room | 1,520 | 5.1 | 28.9 |
| 70/30 | 3,930 | 285 | 170 | 2.5 | do | 1,520 | 5.5 | 32.9 |

The above yarns were false-twist crimped over a range of temperatures. The bulk developed by the yarn was determined by measuring the crimp ratio. The results of these experiments are quoted in Table 6. Results obtained for 66 nylon are included for the purpose of comparison.

TABLE 6

| | False-twist temp., °C. | Crimp ratio |
|---|---|---|
| Yarn: | | |
| 70/20 6.8 nylon | 180 | 41.7 |
| | 190 | 43.5 |
| | 200 | 45.8 |
| 70/20 6.6 nylon | 200 | 32 |
| 70/34 6.8 nylon | 180 | 25.7 |
| | 190 | 30.0 |
| | 200 | 33.0 |
| 70/34 6.6 nylon | 200 | 22 |

NOTE:
Crimp ratio is defined by being expressed as $$\frac{L_2 - L_1}{L_2} \times 100$$

where $L_1$ = length of yarn (crimped) when under a load of 0.001 g./denier when suspended freely.
$L_2$ = length of yarn (decrimped) when under a load of 0.1 g./denier when suspended freely.

The figures for crimp ratio obtained for 6.8 nylon are notably better than those obtained for 6.6 nylon.

EXAMPLE 12

6.8 nylon polymer having an R.V. of 62.9 and obtained in the manner described in Example 1, was spun at 758 ft./min. using a gravity melter and drawn at a draw ratio of 5.51 at a temperature of 180° C. at 820 ft./min. to give an 840/140 yarn tyre cord yarn. The properties of the yarn, which were measured in a Scott incline plane tester, are given in Table 7.

TABLE 7.—PHYSICAL PROPERTIES OF 840/140 6.8 NYLON TYRE CORD YARN

| Yarn sample | Yarn R.V. | Tenacity, g./d. | Ext. at break, percent | I.M. at 5% extension, g./d./100% ext. |
|---|---|---|---|---|
| C25 | 62.9 | 9.9 | 12.6 | 52 |
| C26 | 62.9 | 9.5 | 13.2 | 58 |
| 66 nylon tyre cord | 50 | 9.0 | 16.0 | 40.45 |

The figures for 66 nylon, quoted for comparison, were determined on a typical sample of commercial tyre cord yarn.

Unprocessed tyre cords were prepared in a 2/840 12S/12Z construction. These cords were processed by dipping in Gen-Tac at 20° C. and dried at 150° C. under a tension of 1½ lbs. for 30 seconds and then stretched at 200° C. and under a 9 lb. tension for 30 seconds. The strength loss after 100,000 flexes was measured on a Scott Flexer. Details of the cord properties are given in Table 8. (Gen-Tac is the trade name for latex to which a resorcinol/formaldehyde resin is added.)

TABLE 8.—PHYSICAL PROPERTIES OF 2/840, 12S/12Z 6.8 NYLON TYRE CORDS

| | Unprocessed cords | | | Processed cords | | | |
|---|---|---|---|---|---|---|---|
| | Breaking load lbs. | Ext. at break, percent | E10, percent | Breaking load | Ext. at break | E10, percent | Strength loss per 100,000 flexes, lbs. |
| Yarn sample: | | | | | | | |
| C25 | 33.1 | 20.0 | 9.8 | 31.6 | 11.7 | 4.9 | 2.1 |
| C26 | 33.1 | 22.7 | 10.2 | 34.0 | 14.0 | 5.5 | 2.1 |
| 66 nylon tyre cord | 30.0 | 20–24 | 10 | 30.0 | 16 | 7.5 | 2.5 |

The parameter $E_{10}$ represents the percentage extension of the cord when subjected to a load of 10 lbs.

The above results indicate that tyre cords of 6.8 nylon have superior properties to those of 6.6 nylon.

What is claimed is:

1. In a process for the manufacture of high molecular weight, fiber-forming polyhexamethylene suberamide by the condensation of hexamethylene diamine with suberic acid at about 210–300° C., the improvement which comprises using in said condensation suberic acid prepared by the steps of dimerizing butadiene to form cyclooctadiene and then oxidizing the cyclooctadiene to form the suberic acid.

2. The process of claim 1 wherein said suberic acid is purified prior to condensation and wherein a salt of approximately equimolar proportions of said suberic acid and hexamethylene diamine is formed by heating an aqueous solution of said acid and diamine and said salt is polymerized at superatmospheric pressure and elevated temperature in the presence of a slight excess of hexamethylene diamine to produce a polyhexamethylene suberamide having a vicat softening point of at least 234° C. and a relative viscosity of at least 30 as measured using an 8.4 weight percent solution of the polymer in 90% aqueous formic acid at 25° C.

References Cited

UNITED STATES PATENTS

| | | | |
|---|---|---|---|
| 2,163,636 | 6/1939 | Spanagel | 260—78 |
| 2,172,374 | 9/1939 | Flory | 260—78 |
| 2,190,770 | 2/1940 | Carothers | 260—78 |
| 3,012,994 | 12/1961 | Bell et al. | 260—78 |
| 3,031,433 | 4/1962 | Monroe | 260—78 |

OTHER REFERENCES

Journal of Polymer Science, vol. 28, 1958, pp. 443–445, Trifan et al.

Polyamide Fibers, second edition, 1966, p. 125, Floyd.

HAROLD D. ANDERSON, Primary Examiner

U.S. Cl. X.R.

57—140